US006840858B2

(12) United States Patent
Adams

(10) Patent No.: US 6,840,858 B2
(45) Date of Patent: Jan. 11, 2005

(54) METHOD OF PLAYING A WAGERING GAME AND GAMING DEVICES WITH A BINGO-TYPE SECONDARY GAME

(75) Inventor: William R. Adams, Las Vegas, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/367,314

(22) Filed: Feb. 14, 2003

(65) Prior Publication Data

US 2003/0127793 A1 Jul. 10, 2003

Related U.S. Application Data

(63) Continuation of application No. 09/169,667, filed on Oct. 9, 1998, now abandoned.

(51) Int. Cl.$^{7}$ .............................. A63F 3/06; A63F 13/00

(52) U.S. Cl. .............................. 463/19; 463/20; 463/13; 273/143 R; 273/269; 273/138.2

(58) Field of Search .......................... 273/143 R, 138.2, 273/269, 274; 463/20, 19, 18, 13

(56) References Cited

U.S. PATENT DOCUMENTS

| | | | | |
|---|---|---|---|---|
| 4,695,053 A | | 9/1987 | Vazquez, Jr. et al. | 273/143 |
| 4,743,024 A | * | 5/1988 | Helm et al. | 273/143 R |
| 4,775,155 A | | 10/1988 | Lees | 273/139 |
| 4,836,546 A | * | 6/1989 | DiRe et al. | 463/18 |
| 4,856,787 A | | 8/1989 | Itkis | 273/237 |
| 4,871,171 A | | 10/1989 | Rivero | 463/20 |
| 5,242,163 A | | 9/1993 | Fulton | 463/19 |
| 5,393,057 A | | 2/1995 | Marnell, II | 273/269 |
| 5,411,271 A | | 5/1995 | Mirando | 273/434 |
| 5,536,016 A | | 7/1996 | Thompson | 273/269 |
| 5,609,337 A | | 3/1997 | Clapper, Jr. | 273/143 R |
| 5,611,730 A | | 3/1997 | Weiss | 463/20 |

(List continued on next page.)

FOREIGN PATENT DOCUMENTS

| | | |
|---|---|---|
| EP | 0 449 433 | 10/1991 |
| EP | 0464935 A1 * | 1/1992 |
| GB | 1242298 | 8/1971 |
| GB | 2137392 | 10/1984 |
| GB | 2226436 | 6/1990 |
| WO | WO 00/12186 | 3/2000 |

OTHER PUBLICATIONS

Bingo Game Brochure published by Casino Data Systems in 1998.
Jackpot Bingo published by CDS.com printed on Apr. 12, 2001.
Full House Brochure published by Anchor Games in 2000.
Match Reel Game Bonus Description published by IGT.
Jewel in the Crown Brochure published by Barcrest, Ltd.
Jewel in the Crown Brochure published by IGT in 1999.

*Primary Examiner*—Benjamin Layno
(74) *Attorney, Agent, or Firm*—Marshall, Gerstein & Borun LLP

(57) ABSTRACT

Methods of playing games of chance and gaming devices comprise a first gaming unit, e.g., three reels, and a display of a bingo-type game actuatable in response to a signal from the first gaming unit.

27 Claims, 4 Drawing Sheets

U.S. PATENT DOCUMENTS

| | | | | |
|---|---|---|---|---|
| 5,630,753 | A | 5/1997 | Fuchs | 463/20 |
| 5,639,089 | A | 6/1997 | Matsumoto et al. | 273/142 |
| 5,641,730 | A | 6/1997 | Brown | 508/156 |
| 5,645,486 | A | 7/1997 | Nagao et al. | 463/27 |
| 5,647,798 | A | 7/1997 | Falciglia | 273/143 R |
| 5,755,619 | A | 5/1998 | Matsumoto et al. | 463/19 |
| 5,779,544 | A | 7/1998 | Seelig et al. | 463/6 |
| 5,788,573 | A | 8/1998 | Baerlocher et al. | 463/16 |
| 5,823,874 | A | 10/1998 | Adams | 463/17 |
| 5,833,537 | A | 11/1998 | Barrie | 463/21 |
| 5,848,932 | A | 12/1998 | Adams | 463/20 |
| 5,851,148 | A | 12/1998 | Brune et al. | 463/25 |
| 5,882,261 | A | 3/1999 | Adams | 463/20 |
| 5,927,714 | A | 7/1999 | Kaplan | 273/143 |
| 5,935,002 | A | 8/1999 | Falciglia | 463/19 |
| 5,947,820 | A | 9/1999 | Morro et al. | 463/9 |
| 5,980,384 | A | 11/1999 | Barrie | 463/16 |
| 5,997,401 | A | 12/1999 | Crawford | 463/20 |
| 6,019,369 | A | 2/2000 | Nakagawa et al. | 273/246 |
| 6,059,658 | A | 5/2000 | Mangano et al. | 463/16 |
| 6,089,976 | A | 7/2000 | Schneider et al. | 463/16 |
| 6,089,978 | A | 7/2000 | Adams | 463/20 |
| 6,093,102 | A | 7/2000 | Bennett | 463/20 |
| 6,120,377 | A | 9/2000 | McGinnis, Sr. et al. | 463/20 |
| 6,126,542 | A | 10/2000 | Fier | 463/16 |
| 6,186,894 | B1 | 2/2001 | Mayeroff | 463/20 |
| 6,224,482 | B1 | 5/2001 | Bennett | 463/20 |
| 6,224,483 | B1 | 5/2001 | Mayeroff | 463/20 |
| 6,231,442 | B1 | 5/2001 | Mayeroff | 463/20 |
| 6,302,790 | B1 | 10/2001 | Brossard | 463/20 |
| 6,315,660 | B1 | 11/2001 | DeMar et al. | 463/16 |
| 6,338,678 | B1 | 1/2002 | Seelig et al. | 463/17 |
| 6,461,241 | B1 | 10/2002 | Webb et al. | 463/20 |

* cited by examiner

210

METHOD OF PLAYING A WAGERING GAME AND GAMING DEVICES WITH A BINGO-TYPE SECONDARY GAME

This is a continuation of U.S. Ser. No. 09/169,667, filed Oct. 9, 1998 now abandoned, which is incorporated herein by reference in its entirety.

The present invention is directed to methods of playing wagering games and gaming devices comprising a second payout indicator comprising a bingo-type game.

BACKGROUND OF THE INVENTION

Games of chance have been enjoyed by people for thousands of years and have enjoyed widespread popularity in recent times. Many people enjoy playing a wide variety of games that they have not previously played. Playing new games adds to the excitement of this recreational activity particularly when some form of "gaming" is involved. As used herein, the term "gaming" and "gaming devices" are used to indicate that some form of wagering is involved, and that players must make wagers of value, whether actual currency or some equivalent of value, e.g., token or credit.

One popular game of chance that has long been enjoyed by many players is the slot machine. Conventionally, a slot machine is configured for a player to input something of value, e.g., a denomination of currency or house token or other representation of currency or credit, and then to permit the player to activate the device which causes a plurality of reels to spin and ultimately stop to display a random combination of some form of indicia, for example, numbers or symbols. If this display contains one of a preselected plurality of winning combinations, the machine releases money into a payout chute or onto a credit meter for the player. For example, if a player initially wagered two coins of a national currency and that player won a high payout, that player may receive fifty coins of the same denomination in return.

Since it is desirable to offer players games which they have not played before, it would be desirable to provide a player with new games and additional opportunities to receive winning payouts. It would be particularly desirable to provide new methods of determining the amounts of such winning payouts.

It would therefore also be desirable to provide a novel second payout indicator which is discernible by a player and/or other observers.

SUMMARY OF THE INVENTION

Various embodiments of the present invention comprise gaming devices having a first gaming unit displaying a randomly selected combination of indicia, a signal generated by the first gaming unit and a bingo-type game which is activatable in response to a signal from the first gaming unit. For example, the signal generated by the first gaming unit can correspond with at least one of a predetermined plurality of winning indicia sets of said first gaming unit, the placement of a wager of a predetermined-value such as a maximum wager on the first gaming unit, the simple activation of the first gaming unit by placement of any wager, the player's rate of wagering on the first gaming unit, or some intermediate event occurring during the play of the first gaming unit. For example, if the first gaming unit is a video card game, the bingo-type game can be automatically activated if the initial display comprises a pair or higher. The bingo-type game is preferably displayed on a screen and includes indicia of a bingo card and indicia of bingo markers. The indicia of bingo markers may include bingo numbers or bingo balls displaying bingo numbers which may be displayed at random, at predetermined time increments, or in response to one or more of the signal criteria mentioned above with reference to initially rendering the bingo-type game activatable. For example, bingo numbers may be displayed on a three-dimensional screen every 10 or 20 seconds. Alternatively, the second indicia may be displayed at a predetermined time increment, at a rate related to the players' rate of wagering or after a predetermined number of games have been played.

The award provided by the bingo-type game can either change an award from the first gaming unit or can be independent of the first gaming unit. According to one preferred embodiment of the present invention, the total payout to a player by the bingo-type game is related to the amount of numbers or bingo balls drawn when bingo is won. A payout meter is preferably provided to indicate the winning payout for the bingo game. The payout meter of the bingo-type game preferably decreases after each bingo ball or number is drawn or at increments at which a number of balls or numbers have been drawn. Therefore, it is most advantageous to a player to win bingo quickly.

Several types of balls may be used with the present invention including a fun ball, a re-spin ball, a magic ball or an animation ball. For example, a magic ball reveals numbers which are randomly drawn at certain time increments or after a certain number of games have been played. Possible time increments for drawing numbers on the ball include 5 seconds, 10 seconds, 15 seconds, 20 seconds, etc. A player may still be provided with an opportunity to win bingo even if he stops playing the first gaming unit.

Additionally, according to another embodiment of the present invention, when the payout meter of the bingo game decreases to below a certain amount, the game dispenses a scratch-off card offering the player an additional opportunity to win an award.

According to most preferred embodiments, the bingo-type game may be used with any primary base device where the base game is selected from three reel slot machines, video slot machines, video poker games, Keno, etc. Alternatively, the bingo-type game may be a second screen event to a primary video base game or a dedicated video game.

According to one preferred embodiment of the present invention, a bingo-type game is only activated when a player makes the maximum wager in the first gaming unit. Alternatively, the bingo-type game may be activated when a player makes one of a plurality of predetermined wagers in the first gaming unit.

As described in more detail below, it is within the scope of the present invention to provide a payout from the primary gaming unit, a payout indicated by the bingo type game only, a payout from the primary gaming unit or the bingo-type game or a separate, plurality of payouts from the primary gaming unit and the bingo-type game.

Still other embodiments of the present invention comprise gaming devices having electronic means for displaying indicia of rotatable reels such as a video screen and/or means for displaying indicia of a bonus payout indicator, such as a video screen, and/or a payout multiplier.

The present invention also comprises methods for playing a game of chance. One preferred method comprises the steps of a first displaying a randomly selected combination of indicia, said displayed indicia selected from the group consisting of slot reels, indicia of reels, indicia of playing cards, and combinations thereof; said first gaming unit comprising means for generating at least one signal corresponding to at least one select display of indicia; and providing a second indicia of a bingo-type game.

DETAILED DESCRIPTION

Figure 1:
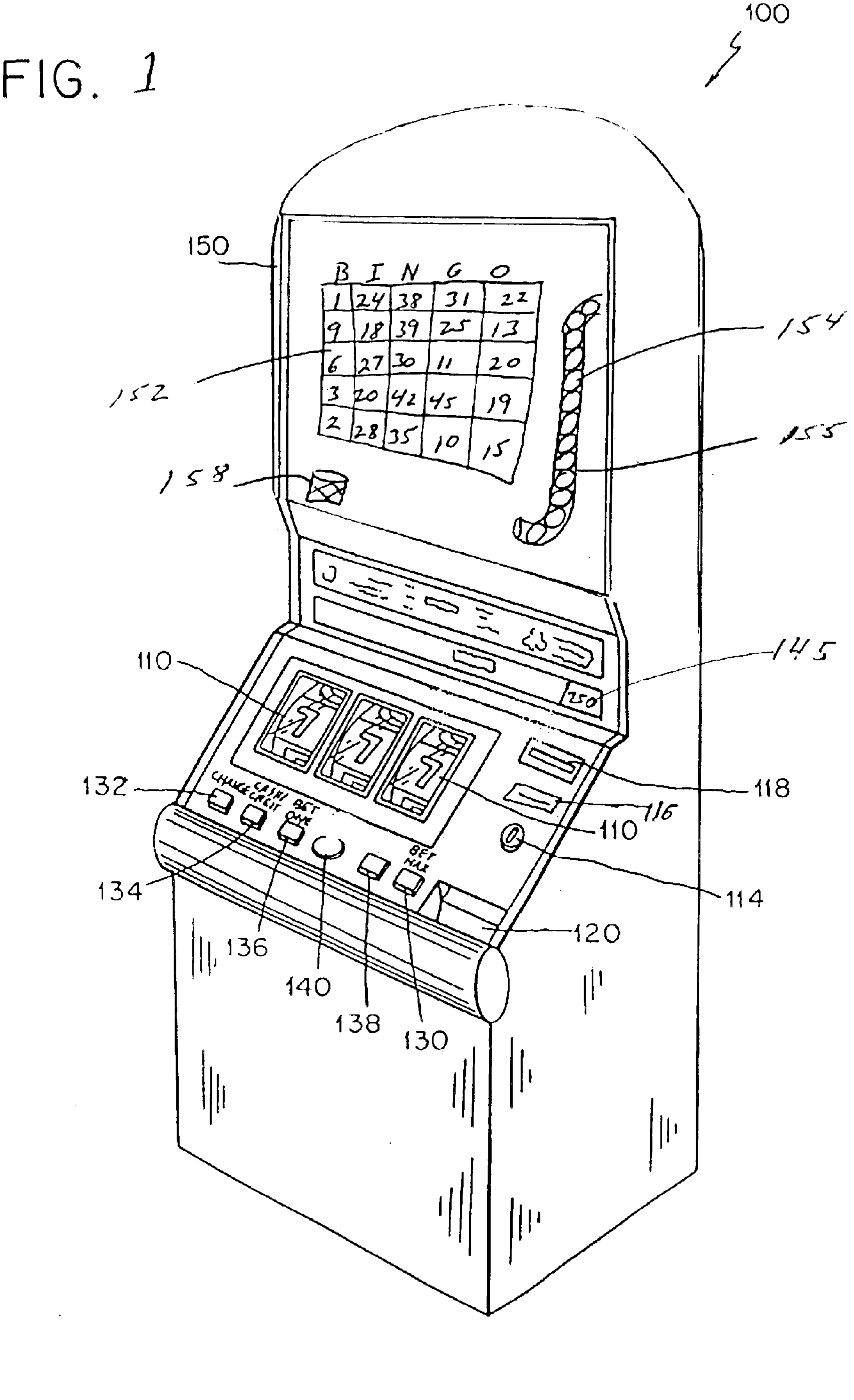
FIG. 1 is a perspective view of a gaming device of the present invention.

The various embodiments of the present invention are designed to provide added excitement to a gaming device in order to increase the enjoyment to players and to serve as an added attraction to potential players. One preferred embodiment of the present invention, illustrated in FIG. 1, comprises a primary gaming unit which comprises three rotatable reels 10, each of which comprise a plurality of indicia on the periphery thereof, and a bingo-type game. While the illustrated embodiment comprises a base unit having three reels, other forms of randomly selected indicia, such as those commonly found in casino-type gaming devices, can also be used without departing from the scope of the present invention. The bingo game comprises a display of a bingo card 152 and display of bingo markers 154 which, in this embodiment, comprise movable numbered balls corresponding to the bingo card. According to this illustrated embodiment, when it is desired to dispense a bingo marker, a ball is shown as being expelled from chute 155. If the ball matches one of the numbers on the bingo card, then the ball is preferably directed to that number and the illumination of that number is changed in some way to indicate that the space is taken. If the ball does not match one of the numbers on the particular display card, then the ball can be directed to a trash bin 158. If desired, the balls can also be moved around the screen in any particularly desired fashion.

The illustrated gaming device comprises a coin slot 114, currency validator 116 and a credit card validator 118. In a manner which will be recognized by those skilled in the art, each reel 110 is designed to rotate and then stop in order to visually display at least one, and preferably a number of indicia. If the collection of indicia displayed by the three reels is one of a predetermined plurality of winning indicia sets, then the player can typically be provided with a winning payout either through coin chute 120 which deposits its winnings into a coin trough or by increasing the player's credits in a credit window 145.

According to one aspect of the present invention, when a player wagers the maximum number of coins in the first gaming unit, the player is provided with an opportunity for a second or enhanced payout via the bingo-type game. According to this illustrated embodiment of the present invention, the second payout is dependent on whether or when the player wins bingo. According to the preferred and illustrated embodiments, after the bingo game has been activated, it is played to completion and the payout provided to the player is dependant upon when the player gets a bingo.

Figure 2:
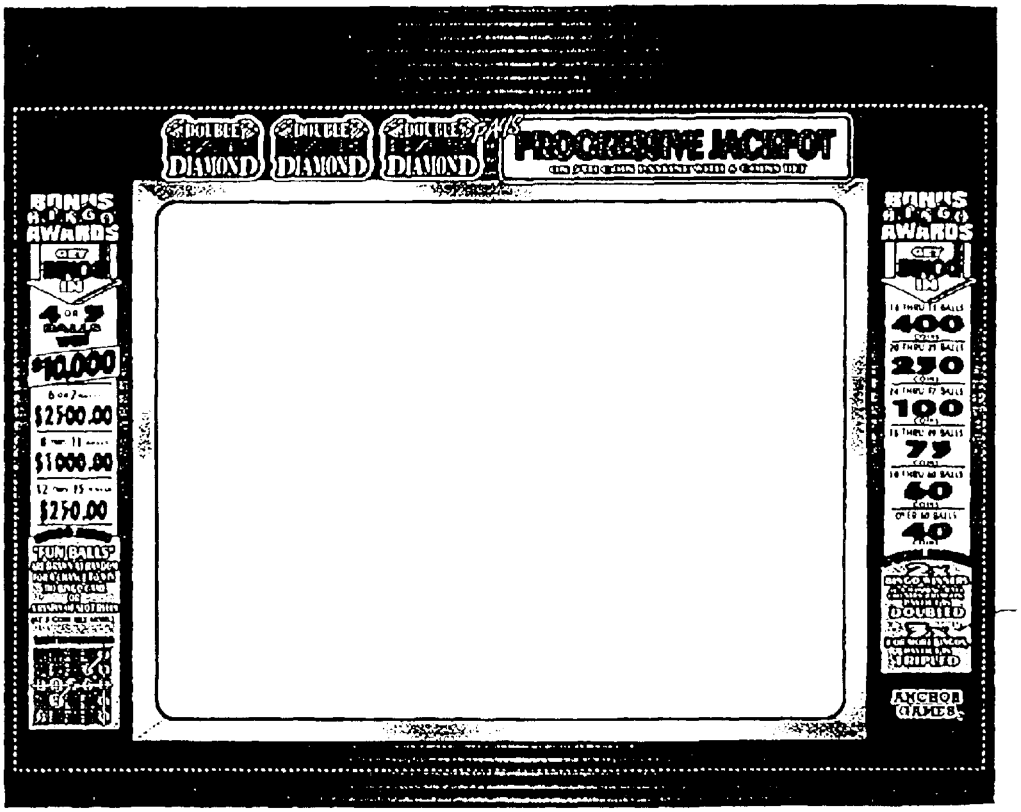
FIG. 2 illustrates a payout chart which may be utilized with one embodiment of the present invention.
Figure 3:
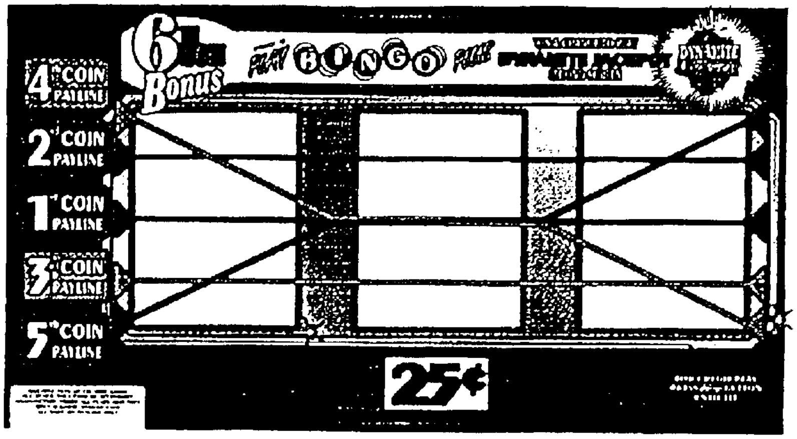
FIG. 3 illustrates a payline display which can be used with the reel display 110.
Figure 4:
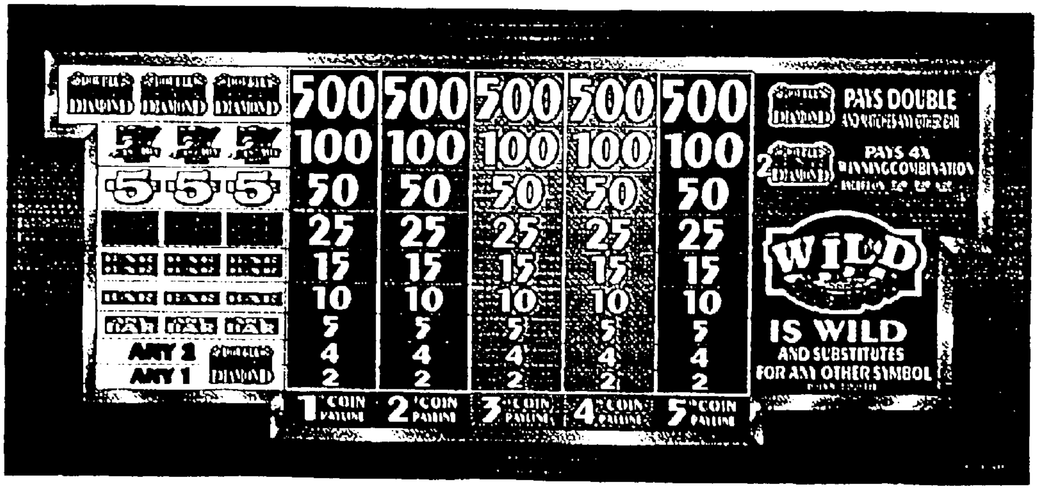
FIG. 4 illustrates a payout table which can be utilized with the primary game.

As illustrated in FIG. 2 on a payout screen which most preferably surrounds the bingo display shown on FIG. 1, a player can win a grand prize, for example, $10,000.00 if a bingo is attained in four-or-five balls. Decreasing payouts can be awarded for bingos of greater numbers of balls, for example $2,500.00 for a bingo in six-or-seven (6 or 7) balls, $1,000.00 for eight-to-eleven (8–11) balls, $250.00 for twelve-to-fifteen (12–15) balls and decreasing payment to a payment of forty (40) coins for a bingo in over sixty (60) balls. As indicated in area 210 of FIG. 2, if the final ball which generates a bingo forms two (2) bingos or three (3) bingos, then the player's award can be doubled, tripled, respectively. The bingo screen can also indicate other payouts. For example, in FIG. 2, it is indicated that a player will receive a progressive jackpot if the player attains a certain outcome on a certain payline with a predetermined number of coins bet. In this embodiment, if a player attains three DOUBLE-BAR DIAMOND indicia on the fifth payline after having wagered six (6) coins, then the player wins a progressive jackpot. The paylines for the primary game are indicated in FIG. 3. Furthermore, FIG. 4 illustrates one example of a payout on the base game.

According to one preferred embodiment, a gaming device is provided with a base game and an opportunity for a second or enhanced payout wherein the value of the second payout is determined in part upon the number of balls or numbers that have been drawn on a secondary unit displaying a bingo game. According to the preferred illustrated embodiment of the present invention described above, the number of balls drawn is dependent upon the bingo card, i.e., balls are drawn until bingo is won.

It is also within the scope of the present invention to provide non-monetary prizes or losing spaces wherein no additional prize is provided and/or wherein the prize normally associated with the indicia shown on the primary gaming unit reels 110 is reduced.

When the game is not in use, the bingo card component, and/or the reels can be set to an attract mode wherein a message is displayed to potential players or play is simulated.

While separate screens are preferred, both the reels and the bingo game indicator could be displayed on the same video screen. The illustrated embodiment of the present invention is considered most preferable since it is believed that players prefer to see actual slot reels. Other embodiments are also possible while providing the advantages of the present invention. Specifically, it is feasible to replace the spinning reels with other forms of gaming units, for example, a visible indicia of reels or indicia of playing cards, shown for example on a video screen.

Figure 5:
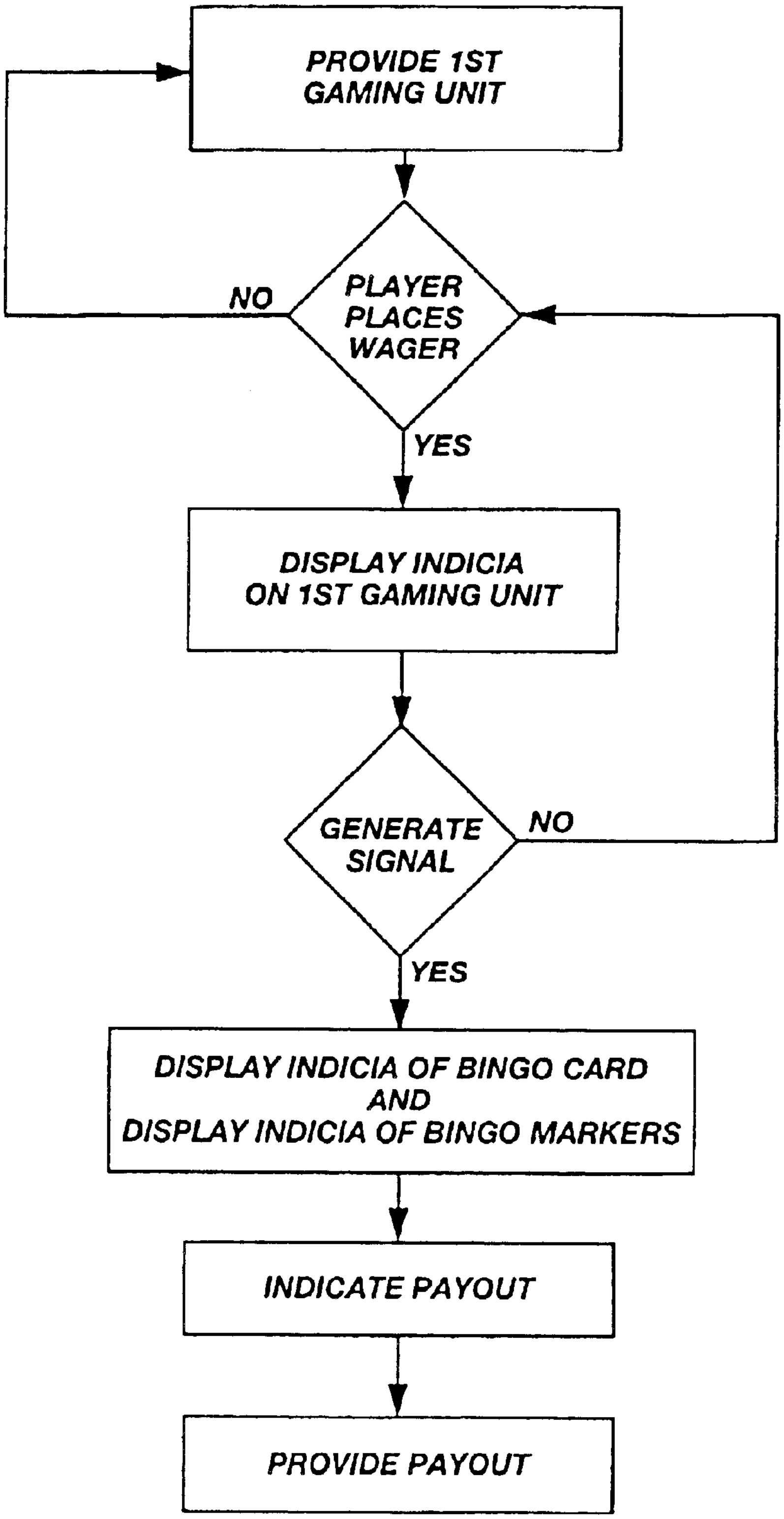
FIG. 5 is a flow chart illustrating the logic utilized according to one embodiment of the present invention.

As illustrated in FIG. 5, the present invention also includes methods of conducting a wagering game of chance comprising the steps of providing a player with an opportunity to place a wager, displaying a randomly selected combination of indicia, said displayed indicia selected from the group consisting of reels, indicia of reels, indicia of playing cards, and combination thereof, generating at least one signal corresponding to at least one select display of said indicia, providing at least one discernible indicia of a second payout indicator, said second payout indicator comprising a bingo card and indicia corresponding to the bingo card.

What is claimed is:

1. A gaming method comprising:

receiving a wager from a player;

causing a first video image representing a primary game to be generated, said video image representing one of the following games; video slots, video poker or video keno, said first video image comprising an image of a plurality of simulated slot machine reels if said game comprises video slots, and said first video image comprising an image of a plurality of playing cards if said game comprises video poker;

determining an outcome of said primary game represented by said first video image;

causing a second video image representing a secondary game to be generated according to the outcome of said primary game, said second video image comprising a bingo-type card having at least one matrix of rows and columns defining a plurality of spaces, each of the plurality of spaces in the at least one matrix being filled with different, randomly selected indicia, and bingo-type markers;

determining an outcome of said secondary game represented by said second video image independent of the outcome of said primary game; and determining a value payout associated with the outcome of at least one of said primary and secondary games.

2. The gaming method according to claim 1, comprising receiving a maximum wager from a player.

3. The gaming method according to claim 1, comprising causing a second video image representing a secondary game to be generated according to the outcome of said primary game, said second video image comprising a bingo-type card having at least one matrix of rows and columns defining a plurality of spaces, each of the plurality of spaces in the at least one matrix being filled with different, randomly selected indicia, and bingo-type markers displayed at predetermined time increments.

4. The gaming method according to claim 1, comprising causing a second video image representing a secondary game to be generated according to the outcome of said primary game, said second video image comprising a bingo-type card having at least one matrix of rows and columns defining a plurality of spaces, each of the plurality of spaces in the at least one matrix being filled with different, randomly selected indicia, and bingo-type markers displayed at rate related to a rate at which the player's wagers are received.

5. The gaming method according to claim 1, comprising causing a second video image representing a secondary game to be generated after a predetermined number of outcomes of said primary game, said second video image comprising a bingo-type card having at least one matrix of rows and columns defining a plurality of spaces, each of the plurality of spaces in the at least one matrix being filled with different, randomly selected indicia, and bingo-type markers.

6. The gaming method according to claim 1, comprising determining a value payout associated with the outcome of at least one of said primary game only, said secondary game only, and said primary and secondary games.

7. The gaming method according to claim 1, comprising incrementing a payout meter according to said value payout.

8. The gaming method according to claim 1, comprising initially incrementing and then decrementing a payout meter until the payout meter equals the value payout.

9. The gaming method according to claim 1, comprising providing value according to said value payout.

10. A gaming method comprising:

receiving a wager from a player;

causing a first video image representing a slots game to be generated, said video image representing a plurality of simulated slot machine reels of a slots game, each of said slot machine reels having a plurality of slot machine symbols;

determining an outcome of said slots game represented by said first video image;

causing a second video image representing a secondary game to be generated according to the outcome of said slots game, said second video image comprising a bingo-type card having at least one matrix of rows and columns defining a plurality of spaces, each of the plurality of spaces in the at least one matrix being filled with different, randomly selected indicia, and bingo-type markers;

determining an outcome of said secondary game represented by said second video image independent of the outcome of said slots game; and determining a value payout associated with the outcome of at least one of said slots and secondary games.

11. The gaming method according to claim 10, comprising receiving a maximum wager from a player.

12. The gaming method according to claim 10, comprising causing a second video image representing a secondary game to be generated according to the outcome of said slots game, said second video image comprising a bingo-type card having at least one matrix of rows and columns defining a plurality of spaces, each of the plurality of spaces in the at least one matrix being filled with different, randomly selected indicia, and bingo-type markers displayed at predetermined time increments.

13. The gaming method according to claim 10, comprising causing a second video image representing a secondary game to be generated according to the outcome of said slots game, said second video image comprising a bingo-type card having at least one matrix of rows and columns defining a plurality of spaces, each of the plurality of spaces in the at least one matrix being filled with different, randomly selected indicia, and bingo-type markers displayed at rate related to a rate at which the player's wagers are received.

14. The gaming method according to claim 10, comprising causing a second video image representing a secondary game to be generated after a predetermined number of outcomes of said slots game, said second video image comprising a bingo-type card having at least one matrix of rows and columns defining a plurality of spaces, each of the plurality of spaces in the at least one matrix being filled with different, randomly selected indicia, and bingo-type markers.

15. The gaming method according to claim 10, comprising determining a value payout associated with the outcome of at least one of said slots game only, said secondary game only, and said slots and secondary games.

16. The gaming method according to claim 10, comprising incrementing a payout meter according to said value payout.

17. The gaming method according to claim 10, comprising initially incrementing and then decrementing a payout meter until the payout meter equals the value payout.

18. The gaming method according to claim 10, comprising providing value according to said value payout.

19. A gaming method comprising:

receiving a wager from a player;

causing a plurality of mechanical slot machine reels to spin and stop, representing a slots game, determining an outcome of said slots game;

causing a video image representing a secondary game to be generated according to the outcome of said slots game, said second video image comprising a bingo-type card having at least one matrix of rows and columns defining a plurality of spaces, each of the plurality of spaces in the at least one matrix being filled with different, randomly selected indicia, and bingo-type markers;

determining an outcome of said secondary game represented by said video image independent of the outcome of said slots game; and determining a value payout associated with the outcome of at least one of said slots and secondary games.

20. The gaming method according to claim 19, comprising receiving a maximum wager from a player.

21. The gaming method according to claim 19, comprising causing a video image representing a secondary game to be generated according to the outcome of said slots game, said second video image comprising a bingo-type card having at least one matrix of rows and columns defining a plurality of spaces, each of the plurality of spaces in the at least one matrix being filled with different, randomly selected indicia, and bingo-type markers displayed at predetermined time increments.

22. The gaming method according to claim 19, comprising causing a video image representing a secondary game to be generated according to the outcome of said slots game, said second video image comprising a bingo-type card having at least one matrix of rows and columns defining a plurality of spaces, each of the plurality of spaces in the at least one matrix being filled with different, randomly selected indicia, and bingo-type markers displayed at rate related to a rate at which the player's wagers are received.

23. The gaming method according to claim 19, comprising causing a video image representing a secondary game to be generated after a predetermined number of outcomes of said slots game, said second video image comprising a bingo-type card having at least one matrix of rows and columns defining a plurality of spaces, each of the plurality of spaces in the at least one matrix being filled with different, randomly selected indicia, and bingo-type markers.

24. The gaming method according to claim 19, comprising determining a value payout associated with the outcome of at least one of said slots game only, said secondary game only, and said slots and secondary games.

25. The gaming method according to claim 19, comprising incrementing a payout meter according to said value payout.

26. The gaming method according to claim 19, comprising initially incrementing and then decrementing a payout meter until the payout meter equals the value payout.

27. The gaming method according to claim 19, comprising providing value according to said value payout.

* * * * *

UNITED STATES PATENT AND TRADEMARK OFFICE

CERTIFICATE OF CORRECTION

PATENT NO. : 6,840,858 B2
DATED : January 11, 2005
INVENTOR(S) : William R. Adams It is certified that error appears in the above-identified patent and that said Letters Patent is hereby corrected as shown below:

Column 4,
Line 66, “;” should be -- : --.

Signed and Sealed this

First Day of November, 2005

JON W. DUDAS
*Director of the United States Patent and Trademark Office*